Patented June 27, 1950

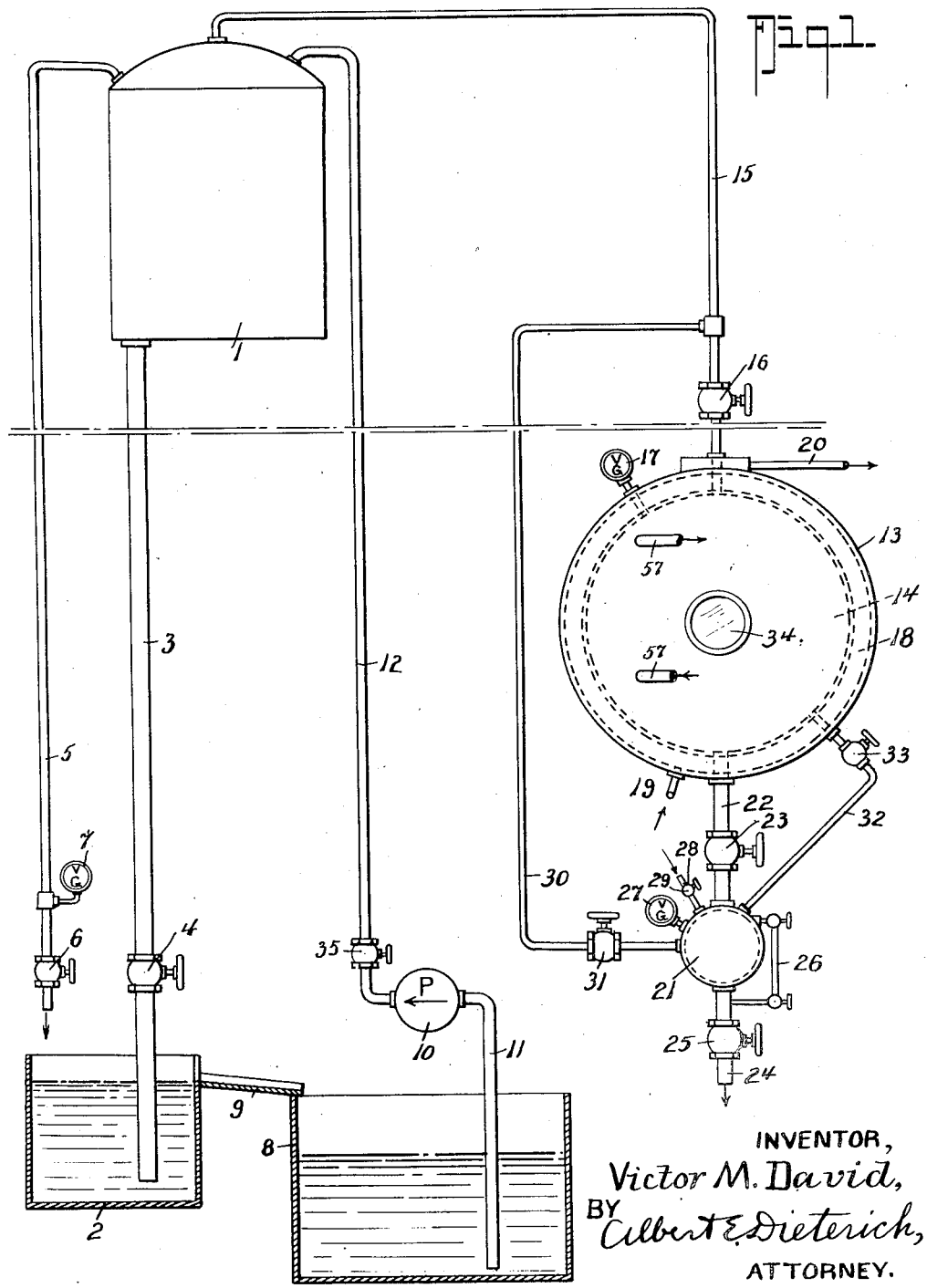

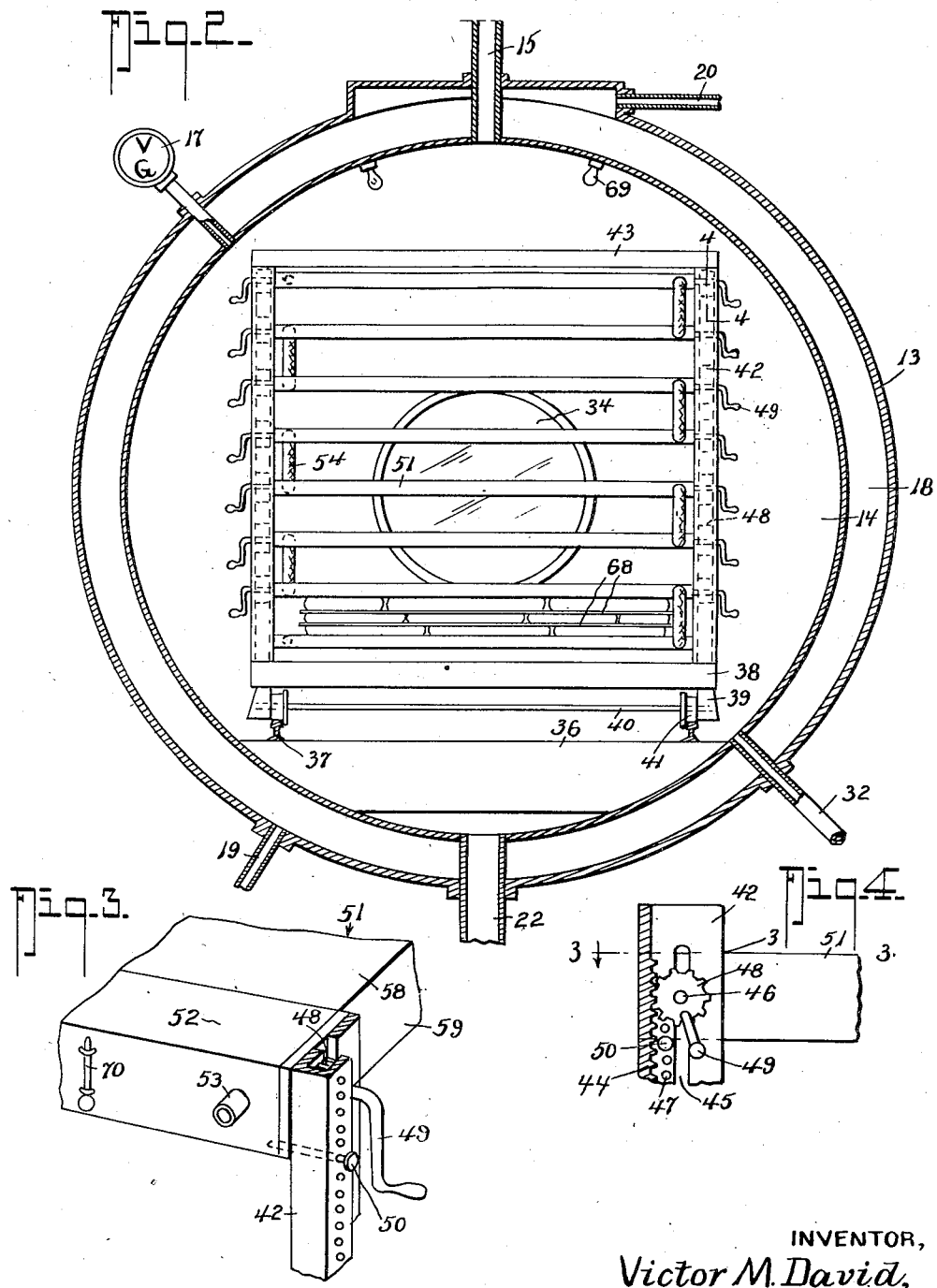

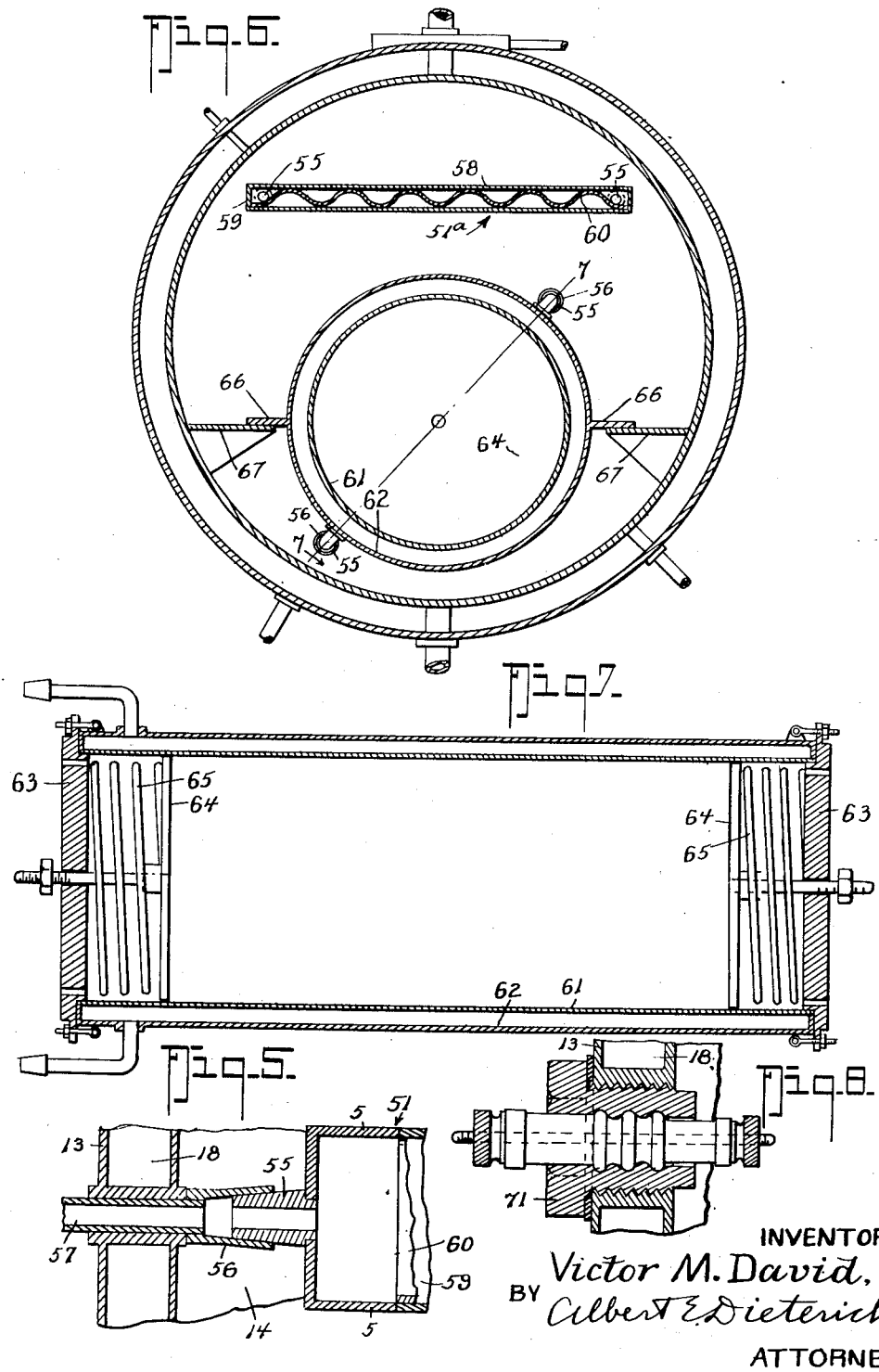

2,512,897

UNITED STATES PATENT OFFICE 2,512,897

MEANS FOR DEHYDRATING AND PRESERVING BY APPLICATION OF A VACUUM

Victor M. David, Vancouver, British Columbia, Canada

Application May 21, 1945, Serial No. 594,875
In Canada May 18, 1945

5 Claims. (Cl. 34—76)

My invention has for its object to provide a new and improved method of and means for dehydrating and preserving foods and other materials, under vacuum, or for the evaporation of liquids for the recovery and concentration of solids therein.

Other objects are as follows:

1. To maintain, in the retort or dehydrating chamber, an initially established vacuum by the continuous condensation of the moisture, extracted from the food (or the liquid to be concentrated) under the vacuum and the application of heat to the mass being treated;
2. To cause said moisture to condense on the walls of the retort or dehydrating chamber and passed off therefrom into a trap or collection chamber, preferably located outside the retort or dehydrating chamber proper;
3. To provide for the release of the condensate from the trap without substantially reducing the vacuum in the retort or dehydrating chamber;
4. To provide means for establishing a vacuum in the trap after it has been emptied of the condensate before operatively re-connecting it with the retort so as not to reduce the vacuum in the retort upon making such re-connection;
5. To make unnecessary the use of continuously operating vacuum pumps of any kind;
6. To reduce the cost of installation and maintenance of apparatus for the purposes stated;
7. To effect the vacuumizing through action of gravity;
8. To provide new and improved heating shelves on which the material to be treated is placed;
9. To provide new and improved means for applying a substantially uniform weight or pressure on the layers from the top to the bottom of the stack;
10. To provide a new and improved arrangement of the shelves to afford more convenience in placing and removing the material on and from the shelves;
11. To improve the structure of the retort so that it may be chilled after the air has been evacuated and the steaming vapors begin to be generated by the application of heat to the shelves on which the material being treated rests, thereby increasing the vacuum in the retort;
12. To provide a novel dehydrating tube for processing hams and beef in masses of cylindrical or other shapes.

Other objects will in part be obvious and in part be pointed out hereinafter.

To the attainment of the aforesaid objects and ends the invention further resides in those novel details of construction, combination and arrangement of parts all of which will be first fully dedescribed and then be specifically pointed out in the appended claims, reference being had to the accompanying drawings in which:

Fig. 1 is a view, somewhat schematic, illustrating the apparatus employed in carrying out my method of dehydrating etc.

Fig. 2 is an enlarged cross section of the retort showing a shelf unit therein in front end elevation.

Fig. 3 is a detail perspective view of a portion of the said unit.

Fig. 4 is a detail section on the line 4—4 of Fig. 2.

Fig. 5 is a detail view of one means of connecting the steam inlet and outlet of the shelves to the steam supply pipes.

Fig. 6 is a view similar to Fig. 2 of a modification.

Fig. 7 is a section on the line 7—7 of Fig. 6.

Fig. 8 is a detailed view hereinafter referred to.

In the drawings in which like numerals and letters of reference indicate like parts in all the figures, 1 represents a water tank disposed at an elevation of 32 feet, approximately, above the retort 13 in which the dehydration or processing takes place. A well 2 is provided into which water from the tank 1 is drained via a pipe 3 having a shut-off valve 4 therein.

An air release pipe 5 is connected to the tank 1 and is provided with a shut-off valve 6 and a vacuum gauge 7. The well 2 has an overflow 9 that drains into a reservoir 8.

A mechanical pump 10 is provided to draw water from the reservoir 8 via a pipe 11 and deliver it via a pipe 12 into the top of the tank 1 at times, a shut-off valve 35 being provided in pipe 12.

13 designates the retort in whose vacuumizing chamber 14 the fish, meat or other products are placed for processing. The chamber 14 is water jacketed as at 18, water being entered at 19 and discharged via duct 20. Any suitable means (not shown) may be used to effect a continuous flow of cool water into and out of the jacket 18. A vacuum gauge 17 is connected with chamber 14.

A pipe 15 connects the top of the water tank 1 with the interior of the chamber 14, a shut-off valve 16 being provided in the connection.

A pipe 22 connects the lowest point of chamber 14 with a condensates receiving reservoir 21, a shut-off valve 23 being connected in said pipe 22, while a drain pipe 24, having a shut-off valve 25 in it, is provided through which the condensate is drained. A water level glass 26 is provided so that the level of water in the reservoir 21 may be observed, and the reservoir emptied as will later more fully appear.

A vacuum gauge 27 and an air admitting pipe 28 with a shut-off valve 29 is also provided for the reservoir 21. A pipe 30 runs from the reservoir 21 to the tank 1 directly or, as shown, to the pipe 15 between the valve 16 and the tank. A shut-off valve 31 is connected in said pipe 30. An equalizing pipe 32, with a shut-off valve 33, connects the reservoir 21 with the chamber 14.

While the shelving unit may be built into the retort, i. e. be non-removable (not shown) I prefer to make the unit portable so that it may be filled outside the retort and then run into the same for the processing. I have illustrated, therefore, the preferred form of my invention in Fig. 2, by reference to which it will be seen that upon sleepers 36 are laid rails 37 on which the wheels 41 of the truck 38 of the shelf unit run, the wheels being on axles 40 mounted in bearings 39 of suitable construction.

The shelf supporting frame consists of four corner posts 42 of channel section (or L-section if desired), and a top frame 43. Each corner post 42 has a rack 44 and a slot (or slots) 45. Pins 46 project through said slots and are adapted to receive the gear and crank units 48, 49 that mesh with the racks 44.

Pin holes 47 are also provided in the corner posts 42 to receive pins 50 that project beneath the shelves and hold them up to such positions as they may be placed by turning the cranks 49.

The shelves 51 which constitute an important improvement over those heretofore used consist of thin metal top and bottom plates 58, and sides 59, front and back headers 52, and internal undulated plates which contact the top and bottom plates at the nodes of the undulations or corrugations and are spot welded to the top and bottom plates as best shown in Fig. 6. Each heating plate has its end headers 52 in communication with the channels in its corrugated plate 6 and each header has a nipple 53 which connects with the nipple of the next adjacent header via a flexible connection 54. One nipple of the top shelf and one of the bottom shelf are tapered as at 55 to fit the tapered sockets 56 of the steam inlet and outlet pipes 57 with a fluid tight connection when the shelf unit is in place in the retort, or any other suitable means may be provided for the purpose.

In the modification shown in Fig. 6 the retort may be provided with one or more fixed heating plates 51ª and with at least one tubular or cylindrical heating tube 61. The tube 61 includes a steam jacket 62, a removable end head 63, a plunger 64 and a plunger pressing spring 65. It may also be provided with fins 66 to support the cylinder on fixed tracks 67 in the cylinder 61.

Suitable steam inlet and outlet pipe connections similar to those shown in Fig. 5 may be employed to connect the jacket 62 with the outside supply and exhaust pipes.

In using my apparatus the material to be dehydrated is placed in the retort chamber 14 and after closing the door of the retort the air in the retort chamber is withdrawn in the following manner:

With valve 4 closed and valves 35 and 6 open water is pumped from reservoir 8 into tank 1 until tank 1 has been filled whereupon valves 35 and 6 are again closed (valve 31 also being closed). With valves 25, 28, 31 and 33 closed valve 16 is opened and then valve 4 is opened. This permits water to flow from tank via pipe 3 into well 2. This causes air from chamber 14 to be sucked into tank 1 and the pressure in chamber 14 falls. When no more water flows from tank 1 to well 2 valves 4 and 16 are closed, valves 35 and 6 opened and pump 10 operated to fill the tank again after which valves 6 and 35 are again closed, and valve 16 opened. Valve 4 is again opened and the water drained from tank 1 again. This process is repeated until vacuum gauges 7 and 17 show the vacuum desired exists in chamber 14.

Steam or hot water is then turned into the heating plates, and cold water is passed through the jacket 18 to chill the wall of the chamber 14. The moisture driven off during the heating period is condensed on the cool surface of the heating chamber and flows or drains via pipe 22 into the condensate reservoir 21, valve 23 being open during the vacuumizing and heating periods. The condensation of the vapors prevents any substantial decrease of vacuum in chamber 14. However, should the pressure in chamber 14 rise above the desired minimum, with tank 1 full of water, valves 16 and 4 may again be opened until the desired vacuum has again been established in chamber 14, whereupon valve 16 is again closed (and tank 1 refilled as before).

Without stopping the operation of dehydration in chamber 14 it is possible to empty the condensate reservoir. When the glass 26 shows that reservoir 21 is filled valves 23, 31 and 33 are closed and valves 29 and 25 opened. The condensate will then flow out through pipe 24. As soon as reservoir 21 has been emptied valves 25 and 29 are again closed and valves 31 and 4 open until vacuum gauge 27 reads the same as gauge 17 whereupon valves 31 and 4 are closed. Valves 23 and 33 are again opened and condensate begins to flow again from chamber 14 to reservoir 21. Pipe 32 is a pressure equalizing pipe between chamber 14 and reservoir 21.

Instead of using the water from tank 1 to vacuumize reservoir 21, any other suitable means may be employed, as for instance a small mechanical suction pump, since the capacity of reservoir 21 is quite small compared to that of the retort.

It has been found through research that various types of foods process more suitable under different stages of rarity in the vacuum chamber or retort. In the case of certain species of fish a high vacuum of 29" or 30" does not injure the food products, whereas for instance, in the case of dehydrating eggs which, being in liquid form, it is observed that the eggs will boil too rapidly and become foamy and over-flow the receptacles at any rarity greater than 26" at 160° F. Therefore it has been found that once the desired vacuum has been obtained for the type of food being processed through my method, namely extracting the moisture from the product by evaporation and then condensing the same as above mentioned, the vacuum chamber retains a constant desired vacuum throughout the process.

A further advantageous feature of my invention lies in the type of heating shelf employed, namely a shelf composed of thin top and bottom plates with a corrugated plate between the top and bottom plates and welded thereto at close intervals (approximately 2 inches) as before described, otherwise extraordinary heavy steel plates would have to be used in order to prevent their bulging and drawing apart under heat and high vacuum. The purpose for having flat plates on the bottom as well as the top is to afford a larger production in that it is found that the plates must necessarily be a few inches apart in order that the products to be dehydrated may be placed in position by hand, between the said heating plates, as shown in my drawing attached.

It is necessary that the product be in thin layers for a rapid dehydration, approximately ½ inch, more or less, and heat conducted by actual contact to the plates.

It is found that it is advantageous to use an unbreakable thin type of material such as "Plexiglas," as trays or sheets 68, which will withstand the heat and yet not take up great space, such as plate glass or other heavy material, whereas the "Plexiglas" will not adhere to any kind of food product during cooking or the dehydration process, this being an advantage over other types of materials for that purpose, in that I can pile or stack several layers of food products, one on top of the other, so that the same will come in contact with the top shelf. It is found by doing this, the dehydration process is hastened in that a great quantity of foods may be dehydrated during the same operation; for instance, if it is found necessary to keep the heating shelves approximately 3" apart so that the products may be placed within by hand, it would be readily understood that it would be a waste of space and time to process only one layer of food products ½ inch thick in each operation, whereas by using a material such as "Plexiglas" which is very thin, strong and unbreakable, I can get as many as four or five layers between each pair of shelves, increasing the production by 400 or 500%; and the top layer which is next to the bottom of the upper heating shelf will dehydrate just as rapidly as the products on the bottom plate of the same tier.

Regarding the several thin layers of the products piled in tiers between the heating shelves, as described, I have found this is most applicable to the dehydration of fish and meats; for it is necessary, in most cases, to keep fish and meat products in a flattened condition, and by applying slight pressure, which would be afforded by the weight of the layers of products to be dehydrated, and the weight of the "Plexiglas," the products, when processed in this manner, it will remain flattened. This flattened form is a desirable way of packing the dried product after dehydration.

I have hereinbefore described another means of applying weight to the products, that of not having the heating shelves rigidly fixed at a specific distance apart, but to have flexible connections so that each heating shelf, when the space between it and the next lower heating shelf has been filled with the products, can be lowered to the required distance to supply the required weight to sufficiently press the product, such as fish or meats, to keep the same in a flattened, desired shape. By so doing, it will also hasten the dehydration of the same, by producing the heat through actual contact against the product, from the bottom of the top shelf equal to that of the top of the bottom shelf.

For this means of adjustable heating shelves with flexible water, steam or electrical connections, the shelves may be raised when the products have been satisfactorily dehydrated, to afford more space for removing the "Plexiglas" plates out freely from between the heating shelves.

Of course, it is obvious that a further advantage in having the adjustable heating shelves with flexible connections, is that there will be less waste space in the vacuum chamber or retort, thereby affording a greater quantity of material or food stuffs to be placed in the vacuum chamber or retort for each operation.

As mentioned before, this method of retaining the vacuum through the favorable cycle of condensing the vapors instantly as the vapors expand from the moisture in the product, does not necessitate any greater supply of energy for the removal of the vapors than would be experienced in the use of mechanical pumps or steam ejectors, but it would simply mean the use of one or a series of moisture traps or manifolds to receive the condensed vapors while evaporation goes on continuously as long as the heat is being applied to the heating shelves within the vacuum chamber or retort.

It has been my experience that this method of expanding the moisture within the product by the application of heat will assist the raising of the vacuum within the vacuum chamber or retort at the opportune time when it is found difficult to obtain a very high vacuum with the method above described, namely, the elevated water tank, by chilling or cooling of the walls of the retort; this should not be commenced until the air has been removed by the said elevated water tank system, and replaced partly by the vapors expanded from the moisture in the product by the application of heat and through the transferring of this heat to the inner surface of the retort or vacuum chamber. It is apparent that the vacuum chamber or retort is dense with the hot vapors and when the surface of the vacuum chamber or retort is then chilled, and through the process of condensing these hot vapors, the vacuum will then advance to the required height of mercury and will remain as such as long as the surface of the vacuum chamber or retort remains chilled.

I might add that it is very difficult to obtain a higher vacuum than 28" of mercury with the draining of the elevated tank system, as above described, however I have found that by applying heat to the shelves during the process of extracting the air by the water method, the hot vapors from the expanding moisture in the product will replace the air extracted, and yet be able to obtain the 28" by the water method; then by closing the valve to the elevated water tank and chilling the surface of the retort or vacuum chamber, the vacuum gauge will show an increase of vacuum to 30". This will give one a clear illustration of what I consider is an advantage and another novel feature of this dehydration system.

A suitable system of electric lights 69 is installed within the retort also and each shelf may be provided with a thermometer 70 at a suitable place to be visible through one or more windows 34 placed at suitable locations in the door and other parts of the retort where desired.

The connections between the external circuit and the internal circuit of the lighting system through the walls of the retort are made in any suitable way which will effect a hermetic seal and prevent leakage of air and water through the connections. In practice I use a connection 71 similar to a spark plug (see Fig. 8) for each lead-in wire.

In addition to the flat heating shelves above mentioned, I have learned from those who know the art of smoking hams, that there is a great demand for a type of round beef ham in dehydrated form; therefore the cylindrical jacketed dehydrating tube meets with the requirements, as such a device will evenly dehydrate the whole mass of food products more rapidly then applying the heat only to two surfaces, as shown in the flat heating shelves, with the addition of a plunger being pressed from each end by springs, which compresses the food product when the food product shrinks as moisture is being extracted (see Figs. 6 and 7).

From the foregoing description taken in connection with the accompanying drawings it is thought that the construction, operation and advantages of my apparatus and the advantages of my method will be clear to those skilled in the art to which it appertains.

What I claim is:

1. In apparatus of the class described: a retort having a water-jacket; means for causing cold water to flow through said water-jacket; a condensate reservoir; a pipe from the interior of said retort to said condensate reservoir; a shut-off valve in said pipe; a drain for said condensate reservoir; a shut-off valve in said drain; a pressure equalizing pipe connecting said condensate reservoir with the interior of said retort; a shut-off valve in said pressure equalizing pipe; a valved air inlet to said condensate reservoir; and means to establish a desired vacuum within said retort and said reservoir.

2. In apparatus of the class described: a retort having a water-jacket; means for causing cold water to flow through said water-jacket; a condensate reservoir; a pipe from the interior of said retort to said condensate reservoir; a shut-off valve in said pipe; a drain for said condensate reservoir; a shut-off valve in said drain; a pressure equalizing pipe connecting said condensate reservoir with the interior of said retort; a shut-off valve in said pressure equalizing pipe; a valved air inlet to said condensate reservoir; an elevated water tank; a pipe between the interior of said retort and said water tank above the water level in said tank; a shut-off valve in the last named pipe; and a valve-controlled outlet for the water in said tank.

3. In apparatus of the class described: a retort having a water-jacket; means for causing cold water to flow through said water-jacket; a condensate reservoir; a pipe from the interior of said retort to said condensate reservoir; a shut-off valve in said pipe; a drain for said condensate reservoir; a shut-off valve in said drain; a pressure equalizing pipe connecting said condensate reservoir with the interior of said retort; a shut-off valve in said pressure equalizing pipe; a valved air inlet to said condensate reservoir; an elevated water tank; a pipe between the interior of said retort and said water tank above the water level in said tank; a shut-off valve in the last named pipe; a valve-controlled outlet for the water in said tank; a duct between said condensate reservoir and said tank; and a shut-off valve in said duct.

4. In apparatus of the class described: a retort having a water-jacket; means for causing cold water to flow through said water-jacket; a condensate reservoir; a pipe from the interior of said retort to said condensate reservoir; a shut-off valve in said pipe; a drain for said condensate reservoir; a shut-off valve in said drain; a pressure equalizing pipe connecting said condensate reservoir with the interior of said retort; a shut-off valve in said pressure equalizing pipe; a valved air inlet to said condensate reservoir; an elevated water tank; a pipe between the interior of said retort and said water tank above the water level in said tank; a shut-off valve in the last named pipe; a valve-controlled outlet for the water in said tank; and means for filling said tank with water at predetermined times.

5. In apparatus of the class described: a retort having a water-jacket; means for causing cold water to flow through said water-jacket; a condensate reservoir; a pipe from the interior of said retort to said condensate reservoir; a shut-off valve in said pipe; a drain for said condensate reservoir; a shut-off valve in said drain; a pressure equalizing pipe connecting said condensate reservoir with the interior of said retort; a shut-off valve in said pressure equalizing pipe; a valved air inlet to said condensate reservoir; an elevated water tank; a pipe between the interior of said retort and said water tank above the water level in said tank; a shut-off valve in the last named pipe; a valve-controlled outlet for the water in said tank; a duct between said condensate reservoir and said tank; a shut-off valve in said duct; and means for filling said tank with water at predetermined times.

VICTOR M. DAVID.

REFERENCES CITED

The following references are of record in the file of this patent:

UNITED STATES PATENTS

| Number | Name | Date |
|---|---|---|
| 90,545 | Hughes | May 25, 1869 |
| 331,532 | Nichols | Dec. 1, 1885 |
| 522,848 | McCarty | July 10, 1894 |
| 631,214 | Howl | Aug. 15, 1899 |
| 670,436 | Schmidseder | Mar. 26, 1901 |
| 688,152 | Atwood | Dec. 3, 1901 |
| 698,534 | Morel | Apr. 29, 1902 |
| 753,904 | McFarland | Mar. 8, 1904 |
| 794,564 | Stiff | July 11, 1905 |
| 1,007,940 | Gregg | Nov. 7, 1911 |
| 1,086,950 | Stanton | Feb. 10, 1914 |
| 1,123,113 | Derby | Dec. 29, 1914 |
| 1,160,109 | Henrici | Nov. 9, 1915 |
| 1,161,603 | Bradshaw | Nov. 23, 1915 |
| 1,263,392 | Elling | Apr. 23, 1918 |
| 1,272,649 | Fish | July 16, 1918 |
| 1,309,357 | Falk et al. | July 8, 1919 |
| 1,418,638 | Frankel et al. | June 6, 1922 |
| 1,458,403 | Glessner | June 12, 1923 |
| 1,522,966 | Merritt | Jan. 13, 1925 |
| 1,577,709 | Glessner | Mar. 23, 1926 |
| 1,589,504 | Agopian | June 22, 1926 |
| 1,625,548 | Kobiolke | Apr. 19, 1927 |
| 1,756,992 | Quiggle | May 6, 1930 |
| 1,768,296 | Rosenberg | June 24, 1930 |
| 1,902,637 | Grow | Mar. 21, 1933 |
| 2,215,265 | Flosdorf | Sept. 17, 1940 |
| 2,362,117 | David | Nov. 7, 1944 |
| 2,374,232 | Pfeiffer et al. | Apr. 24, 1945 |
| 2,422,557 | Kobiolke | June 17, 1947 |